(No Model.) 2 Sheets—Sheet 1.

A. F. THAYER.
APPARATUS FOR SEPARATING BUTTERMILK FROM BUTTER.

No. 411,943. Patented Oct. 1, 1889.

WITNESSES.
J. M. Hartnett.
B. W. Williams

INVENTOR.
Albert F. Thayer,
By his Atty
Henry Williams (No Model.)  2 Sheets—Sheet 2.
A. F. THAYER.
APPARATUS FOR SEPARATING BUTTERMILK FROM BUTTER.

No. 411,943. Patented Oct. 1, 1889.

WITNESSES.
J. M. Hartnett.
L. B. W. Williams

INVENTOR.
Albert F. Thayer
By his Atty.
Henry W. Williams though of course other materials may be employed

UNITED STATES PATENT OFFICE.

ALBERT F. THAYER, OF MAPLE HILL, KANSAS.

APPARATUS FOR SEPARATING BUTTERMILK FROM BUTTER.

SPECIFICATION forming part of Letters Patent No. 411,943, dated October 1, 1889.

Application filed May 4, 1889. Serial No. 309,653. (No model.)

*To all whom it may concern:*

Be it known that I, ALBERT F. THAYER, of Maple Hill, in the county of Wabaunsee and State of Kansas, have invented a new and useful Apparatus for Separating Buttermilk from Butter, of which the following is a specification.

This invention consists in an apparatus by means of which I carry out a certain process for separating buttermilk from butter, said process being made the subject of a separate application of even date herewith.

Figure 1:
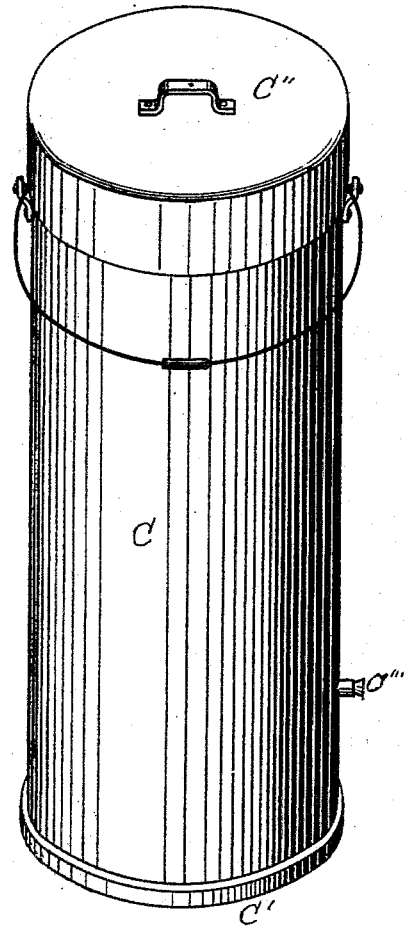
Figure 2:
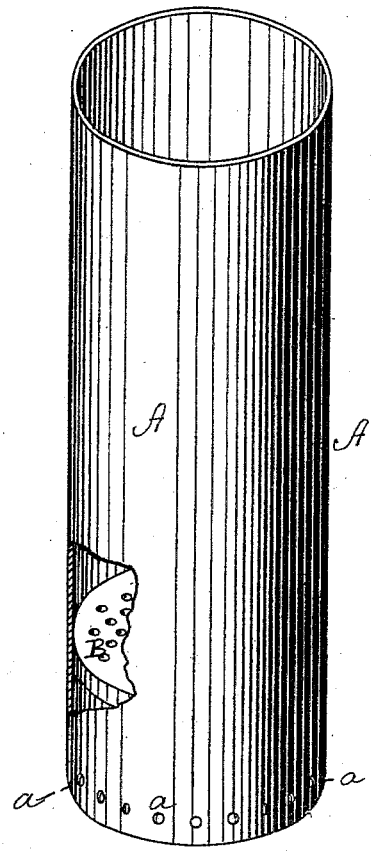
Figure 3:
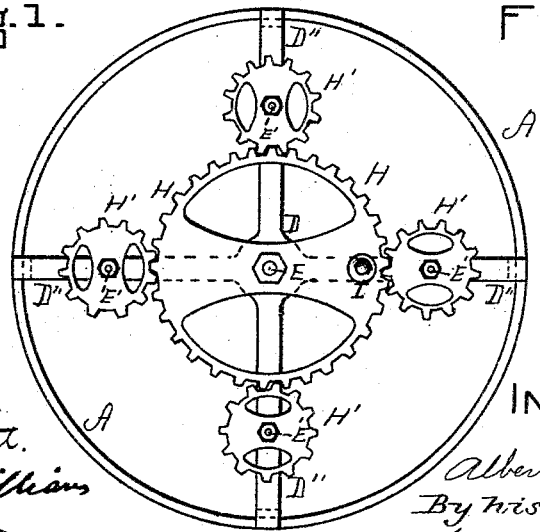
Figure 4:
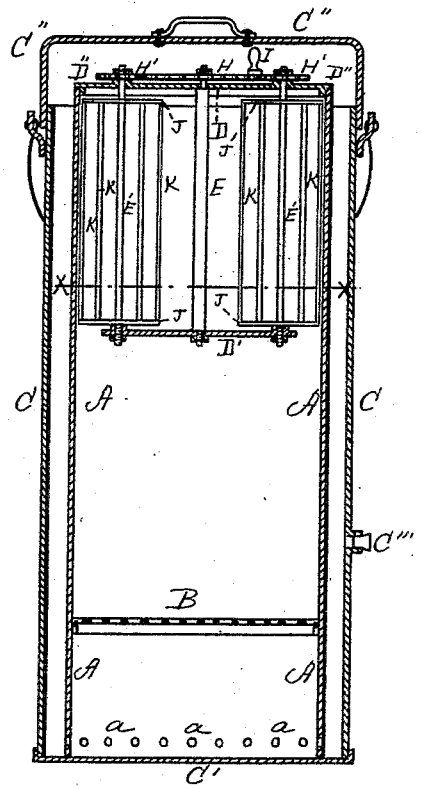
Figure 5:
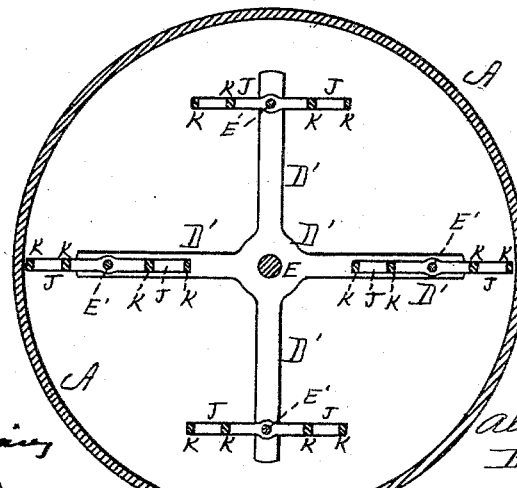

In the accompanying drawings, in which similar letters of reference indicate like parts, Figure 1 is a perspective view of my improved apparatus. Fig. 2 is a perspective view of a vessel which I term the "separator," a small portion being represented as broken out the better to illustrate the invention. Fig. 3 is a plan view of the separator with the beater in position therein. Fig. 4 is a central vertical section of the entire apparatus. Fig. 5 is a horizontal section on line $x$, Fig. 4, of the separator and beater.

A is a tubular vessel without top or bottom, preferably but not necessarily circular in shape, and provided near its lower end with perforations $a$. This vessel is provided at a convenient point, usually below its center, with a perforated shelf, wire screen, or strainer B, of any desirable material or construction.

C is a vessel somewhat larger in diameter than vessel A, preferably but not necessarily circular in shape, and provided with a bottom C', removable cover C'', and outlet C'''.

D and D' are respectively the upper and lower portions of a frame, said upper portion being provided with radial arms D'', which rest on the upper edge of the separator A.

E is a vertical driving-shaft having bearings in the upper and lower portions D D' of the frame, and E' E' are parallel shafts, in any convenient number, arranged around the shaft E and having bearings in the portions D D' of the frame. In the drawings four of these shafts E' are shown. Rigidly secured to the upper end of the driving-shaft E is the gear-wheel H, and rigidly secured to the upper ends of the shafts E' are the pinions H' H', engaged by said gear-wheel H.

I is the actuating-crank.

J J are upper and lower supports rigidly secured to the shafts E' and carrying beating-plates K of any suitable shape and set at different angles.

The parts D D' D'', E E', H H', I J K constitute the butter-beater.

All the parts of the apparatus above named may be made of tin excepting the gear-wheels H H', shafts E E', crank I, and frame D D', which may be made of iron, although of course other materials may be employed if desired.

In using my apparatus I take the separator A and reverse it, and then place on the perforated shelf or strainer B butter which has been churned, but which still retains the buttermilk. I then place the separator A in the vessel C right side up, so that the butter rests on the bottom C' of the vessel and beneath the shelf B. Next I pour in water, which, by means of the perforations $a$, freely circulates through both vessels, and heat it to a certain temperature, with the result that the buttermilk frees itself from the butter and is absorbed or assimilated by the water, and the said butter rises through the perforations in the shelf B to the top of the water, which nearly or quite fills the vessels. Then (or previously, if desired) I place the beater in position, (see Fig. 4,) next, turning the crank, I thoroughly beat the butter into a froth, and last I allow it to cool and become hard.

The butter-beater described may be varied considerably, as I do not confine myself to its exact construction, nor do I claim the principle on which it is constructed as new in itself considered.

Having thus fully described my invention, what I claim, and desire to secure by Letters Patent, is—

The herein-described apparatus for separating buttermilk from butter, consisting of the separator A, provided with the perforated shelf or strainer B and suitable perforations $a$, a butter-beater supported in the upper portion of said separator, and the vessel C, all arranged, combined, and constructed to operate substantially as and for the purpose set forth.

ALBERT F. THAYER.

Witnesses:
J. W. THURSTON,
ALFRED G. BASS.